US006658929B2

(12) United States Patent
Atkinson

(10) Patent No.: US 6,658,929 B2
(45) Date of Patent: Dec. 9, 2003

(54) FLUID GAUGING

(75) Inventor: Harry Atkinson, Berkshire (GB)

(73) Assignee: Smith Group PLC, London (GB)

( * ) Notice: Subject to any disclaimer, the term of this patent is extended or adjusted under 35 U.S.C. 154(b) by 0 days.

(21) Appl. No.: 10/227,281

(22) Filed: Aug. 26, 2002

(65) Prior Publication Data
US 2003/0041660 A1 Mar. 6, 2003

(30) Foreign Application Priority Data

Aug. 31, 2001 (GB) .............................. 0121117

(51) Int. Cl.$^7$ .............................................. G01E 17/00
(52) U.S. Cl. ........................................................ 73/149
(58) Field of Search .............................. 73/149, 290 R, 73/304 C, 32 A, 304 R, 291; 340/618; 702/55

(56) References Cited

U.S. PATENT DOCUMENTS

| 4,056,971 A | * | 11/1977 | van Valkenburg et al. .... 73/629 |
| 4,417,473 A | * | 11/1983 | Tward et al. ............. 73/304 C |
| 4,780,663 A | * | 10/1988 | Mulder ..................... 324/65 P |
| 4,815,323 A | * | 3/1989 | Ellinger et al. ........... 73/290 V |
| 5,315,563 A | * | 5/1994 | Lichtenfels, II et al. ...... 367/99 |
| 5,379,658 A | * | 1/1995 | Lichtenfels, II et al. ... 73/866.5 |
| 5,793,705 A | * | 8/1998 | Gazis et al. ................. 367/98 |
| 5,900,535 A | * | 5/1999 | Doe ............................ 73/32 A |
| 5,996,407 A | * | 12/1999 | Hewitt ....................... 73/290 V |
| 6,006,604 A | | 12/1999 | Rabelo et al. ............ 73/290 R |

FOREIGN PATENT DOCUMENTS

| EP | 0294026 A1 | 12/1988 |
| GB | 2124390 A | 2/1984 |

* cited by examiner

Primary Examiner—Hezron Williams
Assistant Examiner—Tamiko Bellamy
(74) Attorney, Agent, or Firm—Connolly Bove Lodge & Hutz LLP

(57) ABSTRACT

An aircraft fuel-gauging system has flowmeters at the inlet and outlet of a fuel tank. The output of the flowmeters is used to compute the height and volume either of a localised elevated region above the inlet, where fuel flows into the tank, or of a localised depressed region above the outlet where fuel flows out of the tank. Where the gauging probes are located away from the region of the inlet or outlet, the volume derived from the probes is corrected by adding the volume of the elevated region or by subtracting the volume of the depressed region. Where the gauging probes are located in the region of the inlet or outlet, the height output of the probe is corrected either by subtracting the height of the elevated region or by adding the height of the depressed region. The volume is computed from these corrected heights and further corrected by adding the volume of the elevated region or by subtracting the volume of the depressed region.

19 Claims, 2 Drawing Sheets

FLUID GAUGING

BACKGROUND OF THE INVENTION

This invention relates to fluid-gauging systems and methods.

Aircraft fuel tanks commonly have a number of probes arranged to measure the height of fuel at various locations within the tank. With knowledge of the shape of the tank, this information can be used to determine the volume of fuel and hence its mass. The probes may be of various different kinds but are most commonly of a capacitive type having two concentric tubes separated by an annular gap that is filled by fuel to the same height as outside the probe so that the capacitance of the probe varies according to the fuel height. Alternatively, the probes may be of the ultrasonic kind. These function by measuring the time between transmission and reception of an acoustic pulse transmitted through the fuel from the bottom of the probe up to the fuel surface where it is reflected back to the bottom of the probe. The accuracy with which fuel quantity can be measured in an aircraft has a significant effect on flight economics. Where fuel quantity can be measured only with low accuracy, a large margin of error must be employed leading to a greater mass of fuel being carried and a corresponding increase in fuel consumption and reduction in payload.

Aircraft fuel tanks usually have an inlet and an outlet through which fuel is supplied to and from the tank. These are used during refuelling on the ground to supply fuel to and between the tanks. The inlet and outlet are also used during flight when it is necessary to redistribute fuel between tanks, so as to alter weight distribution. In this case, fuel is pumped out of one tank through its outlet and into another tank through its inlet. Fuel may also be circulated between tanks in an aircraft in order to stir the fuel and reduce temperature stratification within the tanks. The inlet and outlet of a tank are usually on its floor. When fuel is pumped rapidly into a tank it will cause the surface of the fuel directly above the inlet to elevate. Similarly, when fuel flows rapidly out of an outlet, the fuel surface directly above the outlet will be depressed. Where all the probes in a tank are located away from the inlet and outlet, they will not detect these localized elevations or depressions. Hence, when fuel flows into the tank, the outputs from the probes will underestimate the true fuel quantity. When fuel flows out of the tank, the outputs of the probes will overestimate the true fuel quantity. Conversely, a system having a probe located close to the inlet may lead to an overestimation of fuel quantity when fuel flows into the tank because the probe will measure the localised elevated height. Similarly, if the system has a probe located close to the outlet, this may lead to an underestimation of quantity when fuel flows out of the tank.

There are other fluid-gauging applications where similar inaccuracies may arise.

BRIEF SUMMARY OF THE INVENTION

It is an object of the present invention to provide an alternative fluid-gauging system and method.

According to one aspect of the present invention there is provided a fluid-gauging system for measuring the quantity of fluid in a tank of the kind having an inlet and or alternatively an outlet, the system including at least one fluid-gauging probe located in the tank to measure the height of fluid at a location, and means for providing an indication of the quantity of fluid flowing into or out of the tank through the inlet or outlet, the system including processor means for providing an indication of fluid quantity using the outputs of the probe and the fluid flow indicating means such as to compensate for localized elevation or depression of the fluid surface in the region of the inlet or outlet.

The processor means may be arranged to compute the volume of fluid in the elevated or depressed region and may be arranged to add the volume of fluid in an elevated region to a volume of fluid calculated from a height of a generalized fluid surface or to subtract the volume of fluid in a depressed region from a volume of fluid calculated from a height of a generalized fluid surface. Where the probe is located away from the inlet, the processor means is preferably arranged to increase the indication of fluid quantity in the tank above that derived from the output of the probe where fluid flows into the tank through the inlet. Where the probe is located away from the outlet, the processor means is preferably arranged to decrease the indication of fluid quantity in the tank below that derived from the output of the probe where fluid flows out of the tank through the outlet. Where the probe is located in the region of the inlet or outlet, the processor means is preferably arranged to calculate a corrected height at the probe taking into account fluid flow into or out of the tank. Where the probe is located in the region of the inlet the processor means is preferably arranged to compute the increase in height produced at the probe from fluid flowing into the tank, the processor means being arranged to deduct the computed increase in height from the probe output to calculate the height of the generalized fluid surface at the probe. The processor means may be arranged to calculate the volume of fluid in the elevated region above the inlet and to add this to a volume derived from the calculated height of the generalized fluid surface. Where the probe is located in the region of the outlet, the processor means is preferably arranged to compute the decrease in height produced at the probe from fluid flowing out of the tank, the processor means being arranged to add the computed decrease in height to the probe output to calculate the height of the generalized fluid surface at the probe. The processor means may be arranged to calculate the volume of fluid absent from the depressed region above the outlet and to subtract this from a volume of fluid derived from the calculated height of the generalized fluid surface. The or each probe may be a capacitive probe or an ultrasonic probe.

According to another aspect of the present invention there is provided a method of fluid gauging including the steps of measuring the height of fluid at a location in a tank, providing a measure of the quantity of fluid flowing through an inlet or outlet of the tank, and using the measure of flow to correct the measure of quantity of fluid in the tank provided from the height measurement.

Where the location is away from the inlet and outlet, the method preferably includes the step of calculating the volume of fluid in an elevated region of the fluid surface above the inlet or the volume of fluid absent from a depressed region above the outlet and adding the volume of the elevated region to or subtracting the volume of the depressed region from the volume of fluid derived from the height measured at the location. Where the location is in the region of the inlet or outlet, the method preferably includes the step of calculating the increase in height of fluid in the region of the inlet as a result of fluid flowing into the inlet and subtracting this from the measured height or calculating the decrease in height of fluid in the region of the outlet as a result of fluid flowing out of the outlet and adding this to the measured height.

An aircraft fluid-gauging system and method according to the present invention, will now be described, by way of example, with reference to the accompanying drawings.

DETAILED DESCRIPTION OF THE PREFERRED EMBODIMENTS

Figure 1:
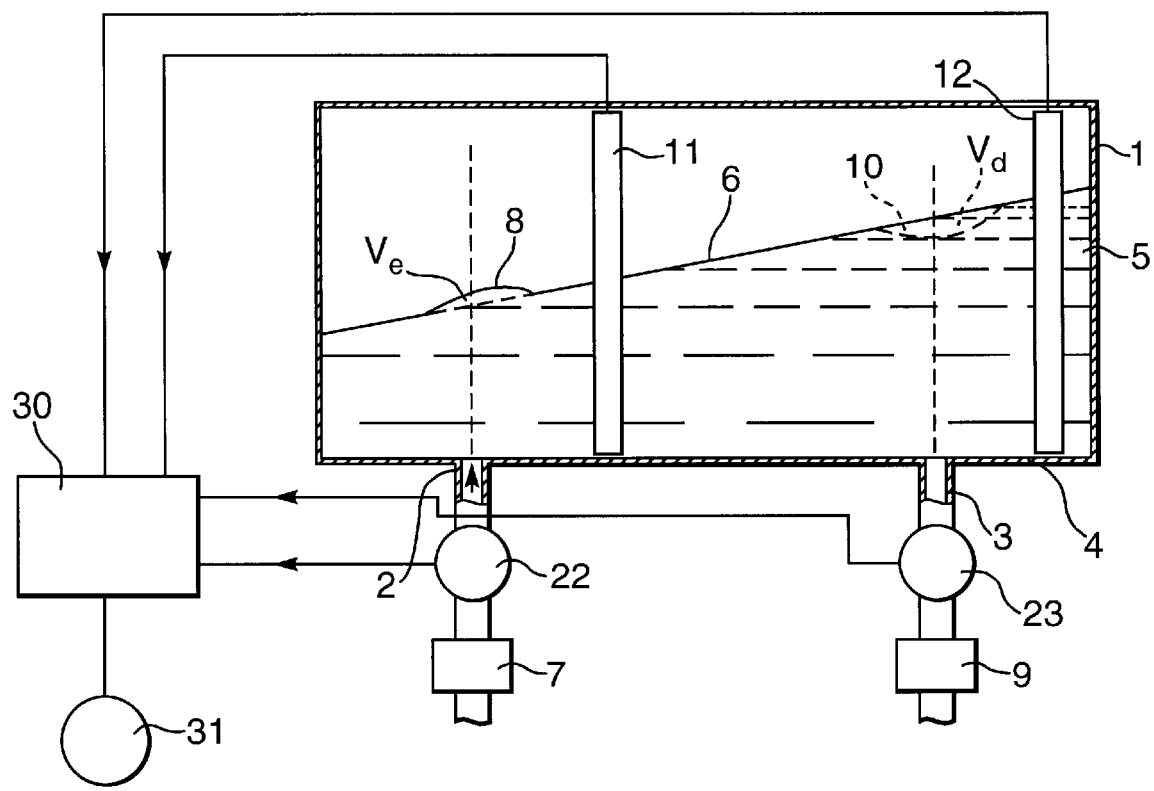
FIG. 1 is a schematic cross-sectional view of the system having two probes located remote from the tank inlet and outlet.
Figure 2:
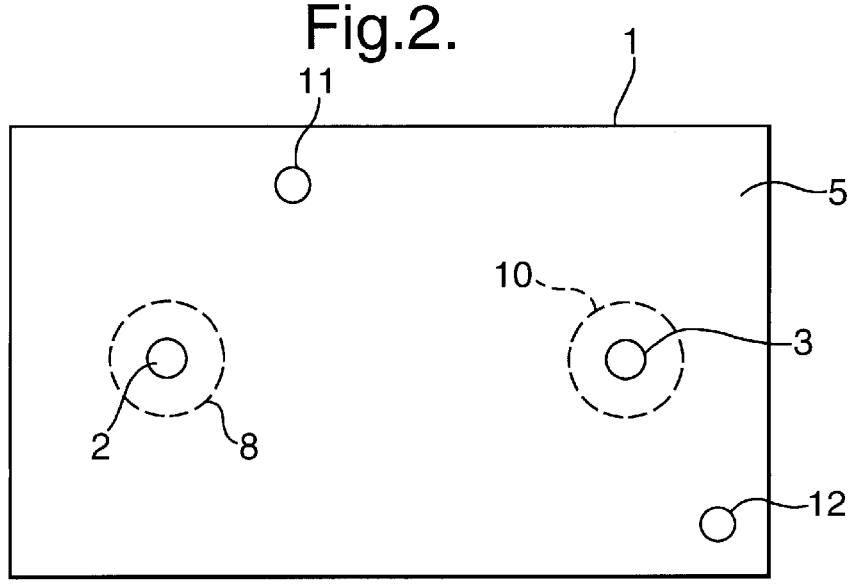
FIG. 2 is a plan view of the tank shown in FIG. 1.

With reference first to FIGS. 1 and 2, the system includes an aircraft fuel tank 1 having an inlet 2 and an outlet 3 on the floor 4. The tank 1 contains fuel 5 having a surface 6, shown at an angle as a result of movement or attitude of the aircraft. A pump 7 pumps fuel to the tank 1 through its inlet 2. This causes a small region 8 directly above the inlet 2 to be elevated slightly above the generalized surface 6, that is, the surface ignoring the localized effects, as a result of the upward flow of fuel from the inlet. A second pump 9, when operated, pumps fuel 5 out of the tank 1 through the outlet 3. This causes a region of the fuel surface directly above the outlet 3 to be depressed slightly, as indicated by the broken line 10.

The system includes two fuel-gauging probes 11 and 12, although any number of probes could be used. The probes 11 and 12 are of the ultrasonic kind sold by Smiths Aerospace Limited of Cheltenham, England but they could be any alternative height measuring probe, such as of the capacitive kind. The probes 11 and 12 extend near vertically in the tank 1 and are immersed in fuel 5. In the present example, both probes 11 and 12 are located remote from the regions 8 and 10 where the fuel surface 6 could be elevated or depressed as a result of fuel being pumped into or out of the tank 1. The system also includes mass flowmeters 22 and 23 located at the inlet 2 and outlet 3 to measure the rate of fuel flow into and out of the tank 1. The flowmeters could be volumetric. A processing unit 30 is connected to receive the outputs from the probes 11 and 12 and the flowmeters 22 and 23 and provides an output indicative of fuel quantity to a display 31 or other utilization means.

The processor 30 is arranged to compensate for inaccuracies in quantity measurement, as a result of fuel flowing into or out of the tank 1, that would arise if the quantity were calculated solely from the outputs of the probes 11 and 12. The processor 30 estimates the volume of fuel $V_e$ in the elevated region 8 or the volume $V_d$ in the depressed region 10 and adds or subtracts this from the gauged volume $V_g$ provided from the outputs of the probes 11 and 12, depending on the rate fuel flows in through the inlet 2 or out through the outlet 3. The volumes $V_e$ and $V_d$ are calculated from the outputs of the flowmeters 22 and 23 respectively. These outputs are used in conjunction with density measurements to calculate mass flow into or out of the tank, and from other known factors such as inlet or outlet cross-sectional area and an approximate calculated height of the depressed or elevated region above the inlet or outlet. This information enables the processor 30 to determine the approximate shape and size of the elevated or depressed region 8 or 10 from which it calculates the volumes $V_e$ and $V_d$. When these correction volumes $V_e$ and $V_d$ are added or subtracted to the gauged volume $V_g$ it gives a more accurate indication of actual instantaneous volume of fuel in the tank 1.

Figure 3:
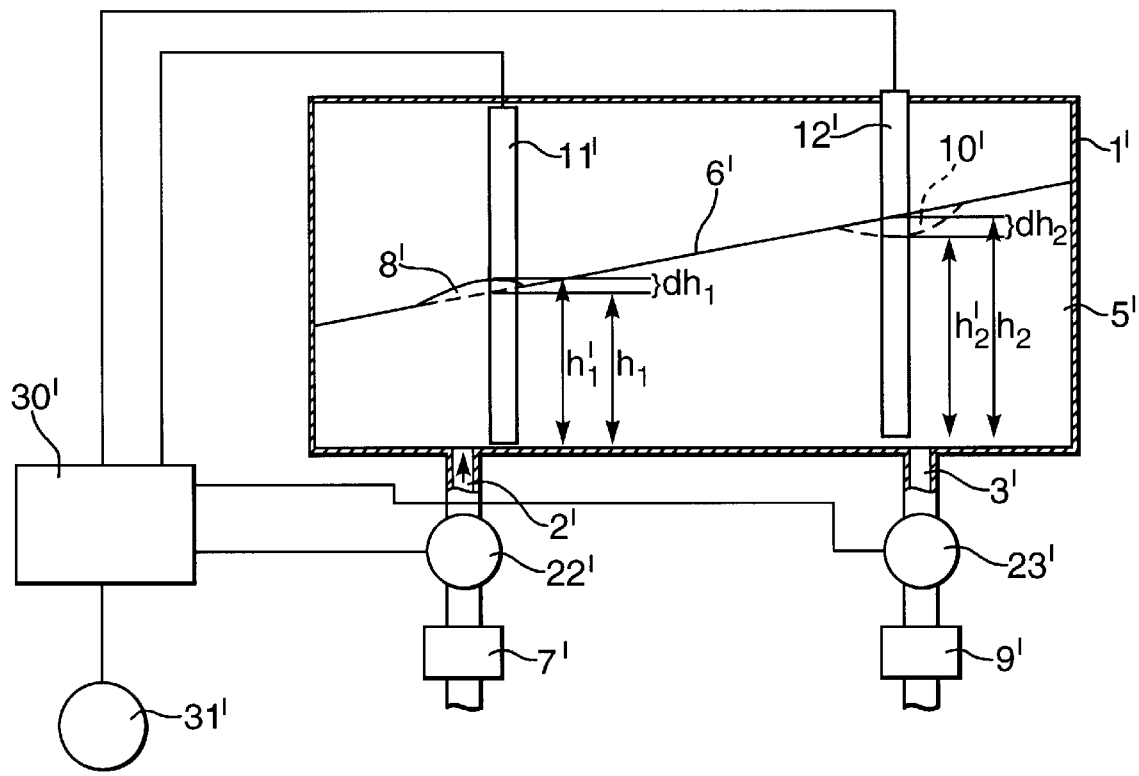
FIG. 3 is a schematic cross-sectional view of the system having two probes located close to the tank inlet and outlet.
Figure 4:
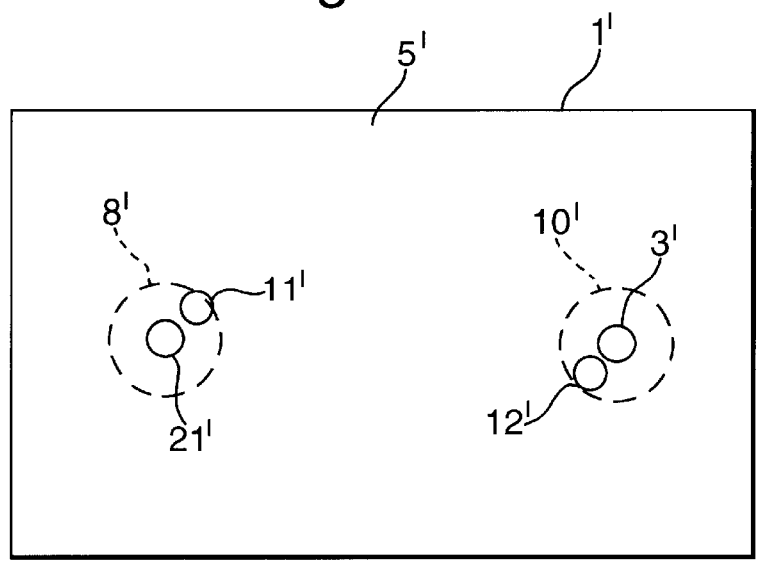
FIG. 4 is a plan view of the tank shown in FIG. 3.

Referring now to FIGS. 3 and 4, the system shown here has components common to those shown in FIGS. 1 and 2 so these are given the same reference number with the addition of a prime '. The system shown in FIGS. 3 and 4 differs from that of FIGS. 1 and 2 in that the probes 11' and 12' are at different locations, that is, they are located close to the inlet 2' and outlet 3', so they will be influenced by any elevated region 8' or depressed region 10'. The processor 30' is appropriately modified to compensate for this. Where fuel flows into the tank 1' at a rate sufficient to produce an elevated region 8', the probe 11' produces an output indicative of a height $h'_1$, above the height $h_1$ of the generalized fuel surface 6'. If this were used in fuel quantity calculations uncorrected, it may produce an erroneously high value. The errors may be exacerbated where the output of the probe 11' is used to determine the angle of the fuel surface 6' because a relatively small error in this angle could lead to a greater error in the calculation of volume, especially for tanks of certain shapes. Another problem could arise in systems where the tank includes greater numbers of probes and where the height outputs of selected ones of the probes are used to estimate the height at other probes, so that any discrepancy between estimated height and the actual height output at the other probes is noted as indicating a probe or system error. Such a system is described in GB2352523. With such a system, a high output from a probe close to an inlet, or a low output from a probe close to an outlet could be taken as indicating a faulty probe or a faulty system.

The processor 30' determines the shape of the elevated region 8' in the same way as referred to above with reference to FIGS. 1 and 2. From this, the processor 30' computes the increased height $dh_1$ at the probe 11' as a result of the elevation of the fuel surface 6' and subtracts this from the height $h'_1$ indicated by the probe to calculate the height $h_1$ of the generalized fuel surface at the location of the probe. This corrected height $h_1$ is then used in the computation of fuel volume $V_g$. This volume $V_g$, however, ignores the additional volume $V_e$ of fuel in the elevated region 8' above the inlet 2', so this is added to the gauged volume to provide an output $V_g + V_e$ to the display 31' indicative of true total volume in the tank. This may be converted to a mass indication in the usual way.

Similarly, where fuel 5 flows out through the outlet 3', the processor 30' computes the height $dh_2$ by which the surface 6' is depressed at the probe 12' adjacent the outlet. The processor 30' adds this correction to the height $h'_2$ output of the probe 12' in order to determine the height $h_2$ of the generalized surface 6' at the location of the probe. The volume $V_d'$ of the depressed region is calculated and subtracted from the volume computed from the corrected height $h_2$.

It will be appreciated that, when no fuel enters or leaves the tank through the inlet or outlet, or when any flow is at a rate insufficient to cause elevation or depression of the surface, the system will function normally without the need for correction. Most aircraft fuel tanks have more than two probes most of which are located remote from the inlet and outlet. The invention is not confined to aircraft fuel-gauging applications but could be used in other fluid-gauging applications. In some tanks, one opening may serve as both an inlet and an outlet. It may not be necessary to use a separate flowmeter since in some cases it may be possible to estimate flow into or out of the tank by monitoring operation of the pump, such as its speed or power consumption. Some tanks may have just an inlet or outlet located on the floor of the tank.

What I claim is:

1. A fluid-gauging system for measuring the quantity of fluid in a tank of the kind having at least one of an inlet and an outlet, where fluid flowing in through the inlet causes a localized elevation of a fluid surface or flowing out through the outlet causes a localized depression of the fluid surface, the system comprising: at least one fluid-gauging probe located in the tank to measure height of fluid at a location; a sensor for providing an indication of quantity fluid flowing into or out of the tank through said inlet or outlet; and a processor for providing an indication of fluid quantity using outputs of said probe and said sensor, said processor being arranged to determine the effect of the flow into the inlet or out of the outlet on localized elevation or depression of the fluid surface and to compensate the measured quantity of fluid accordingly.

2. A fluid-gauging system according to claim 1, wherein said processor is arranged to compute volume of fluid in an elevated or depressed region.

3. A fluid-gauging system according to claim 2, wherein said processor is arranged to add the volume of fluid in an elevated region to a volume of fluid calculated from a height of a generalized fluid surface.

4. A fluid-gauging system according to claim 2, wherein said processor is arranged to subtract the volume of fluid in a depressed region from a volume of fluid calculated from a height of a generalized fluid surface.

5. A fluid-gauging system according to claim 1 where said probe is located away from said inlet, wherein said processor is arranged to increase the indication of fluid quantity in the tank above that derived from the output of said probe where fluid flows into the tank through said inlet.

6. A fluid-gauging system according to claim 1 where said probe is located away from said outlet, wherein said processor is arranged to decrease the indication of fluid quantity in the tank below that derived from the output of said probe where fluid flows out of the tank through said outlet.

7. A fluid-gauging system according to claim 1 where said probe is located in a region of said inlet or outlet, wherein said processor is arranged to calculate a corrected height for fluid at said probe taking into account fluid flow into or out of the tank.

8. A fluid-gauging system according to claim 7 where said probe is located in a region of said inlet, wherein said processor is arranged to compute an increase in height produced at said probe from fluid flowing into the tank, and wherein said processor is arranged to deduct the computed increase in height from the output of said probe to calculate the height of the generalized fluid surface at said probe.

9. A fluid-gauging system according to claim 8, wherein said processor is arranged to calculate the volume of fluid in an elevated region above said inlet and to add the volume of fluid in the elevated region to a volume of fluid derived from the calculated height of said generalized fluid surface.

10. A fluid-gauging system according to claim 7 where said probe is located in a region of said outlet, wherein said processor is arranged to compute a decrease in height produced at said probe from fluid flowing out of the tank, and wherein said processor is arranged to add the computed decrease in height to the output of said probe to calculate the height of the generalized fluid surface at said probe.

11. A fluid-gauging system according to claim 10, wherein said processor is arranged to calculate the volume of fluid absent from a depressed region above said outlet and to subtract the volume of fluid absent from the depressed region from a volume of fluid derived from the calculated height of said generalized fluid surface.

12. A fluid-gauging system according to claim 1, wherein the at least one probe is a capacitive probe.

13. A fluid-gauging system according to claim 1, wherein the at least one probe is an ultrasonic probe.

14. A fluid-gauging system for measuring the quantity of fluid in a tank of the kind having an inlet, and where flow of fluid into the tank via the inlet causes a localized elevation of the fluid surface, the system comprising: at least one fluid-gauging probe located in the tank at a location away from said inlet to measure to height of fluid at said location; a sensor for providing an indication of the quantity of fluid flowing into the tank through said inlet; and a processor for providing an indication of fluid quantity, the processor being arranged to calculate from an output of said sensor the volume of fluid in a localized elevated region above said inlet caused by fluid flow into the tank through said inlet, and the processor being arranged to add the volume of said elevated region to a volume derived from an output of said probe.

15. A fluid-gauging system for measuring the quantity of fluid in a tank of the kind having an outlet, and where flow of fluid out of the tank via the outlet causes a localized depression of the fluid surface, the system comprising: at least one fluid-gauging probe located in the tank at a location away from said outlet to measure the height of fluid at said location; a sensor for providing an indication of the quantity of fluid flowing out of the tank through said outlet; and a processor for providing an indication of fluid quantity, the processor being arranged to calculate from an output of said sensor the volume of fluid in a localized depressed region above said outlet caused by fluid flow out of the tank through said outlet, and the processor being arranged to subtract the volume of said depressed region from a volume derived from an output of said probe.

16. A fluid-gauging system for measuring the quantity of fluid in a tank of the kind having an inlet, and where flow of fluid into the tank via the inlet causes a localized elevation of the fluid surface, the system comprising: at least one fluid-gauging probe located in the tank at a location in a region of said inlet to measure the height of fluid at said location; a sensor for providing an indication of the quantity of fluid flowing into the tank through said inlet; and a processor for providing an indication of fluid quantity, the processor being arranged to calculate from an output of said sensor the increase in height above a generalized fluid surface in said region caused by fluid flow into the tank through said inlet, the processor being arranged to correct the output of said probe to provide a height measurement reduced by said increased height, and the processor being arranged to use the corrected output in computation of fluid quantity.

17. A fluid-gauging system for measuring the quantity of fluid in a tank of the kind having an outlet, and where flow of fluid out of the tank via the outlet causes a localized depression of the fluid surface, the system comprising: at least one fluid-gauging probe located in the tank at a location in a region of said outlet to measure the height of fluid at said location; a sensor for providing an indication of the quantity of fluid flowing out of the tank through said outlet; and a processor for providing an indication of fluid quantity, the processor being arranged to calculate from an output of said sensor the decrease in height below a generalized fluid surface in said region caused by fluid flow out of the tank through said outlet, the processor being arranged to correct the output of said probe to provide a height measurement increased by said decreased height, and the processor being arranged to use a corrected output in computation of fluid quantity.

18. A method of fluid gauging comprising the steps of: measuring the height of fluid at a location in a tank away from an inlet or an outlet of the tank; providing a measure of the quantity of fluid flowing through the inlet or outlet of said tank; calculating the volume of fluid in an elevated region of a fluid surface above said inlet or the volume of fluid absent from a depressed region of the fluid surface above said outlet; and adding the volume of said elevated region or subtracting the volume of said depressed region from the volume of fluid derived from the height measured at said location.

19. A method according to claim 18, wherein said location is in a region of said inlet or outlet, and wherein the method includes the steps of calculating an increase in height of fluid in said region of said inlet as a result of fluid flowing into said inlet and subtracting the increase in height of fluid in said region of said inlet from the measured height or calculating a decrease in height of fluid in said region of said outlet as a result of fluid flowing out of said outlet and adding the decrease in height of fluid in said region of said outlet to the measured height.

* * * * *